Patented Mar. 11, 1941

2,234,934

UNITED STATES PATENT OFFICE 2,234,934

WAX SUSPENSION

John Vernon Steinle and Anton E. Budner, Racine, Wis., assignors to S. C. Johnson & Son, Inc., Racine, Wis., a corporation of Wisconsin No Drawing. Application December 13, 1939, Serial No. 308,962

6 Claims. (Cl. 134—1)

This invention relates to a novel and improved wax composition, and more particularly to aqueous self-lustering wax emulsions which contain coloring matter in a form suitable for the special requirements of water-proofing compositions, leather dressings, polishes, fruit-coatings, etc.

The self-lustering aqueous emulsions are already well known in the art and various formulas and procedures have been disclosed describing their nature and preparations, such as are found in United States Patent Nos. 2,048,303; 1,943,468; 1,981,608; 2,088,795; and 2,045,455. These disclosures stress the importance of close adherence to the known formulas and procedures in order to obtain the stability and the very high dispersion of the wax necessary to impart the self-lustering properties to these emulsions.

The waxes employed in these self-lustering emulsions are the hard waxes such as carnauba, candelilla, and certain of the synthetic waxes, such as I. G. "E". Limited amounts of softer waxes may, however, be added without sacrificing the self-lustering characteristics of the emulsion. The emulsifying agents employed are the water soluble soaps of high molecular weight fatty acids formed with monoethanolamine, diethanolamine, triethanolamine, morpholine and other alkaline substances.

The wax emulsions prepared according to the above disclosures are, more accurately speaking, true colloidal suspensions of wax in water wherein the suspension owes its stability to the very high subdivision of the wax particles, the electrical charge thereon, and the water of hydration. These factors which determine the stability of the suspension are easily altered upon adding foreign ingredients to the emulsion. Thus the introduction of additional ingredients into a stable colloidal solution may change the electrical charge or remove the water of hydration and thereby cause the flocculation of the wax particles or the gelation of the entire suspension.

Although the self-lustering wax-in-water suspensions have been extensively employed as household polishes, their use has by no means been so limited, but has also found ready application in industry for enhancing the appearance of leather goods, fruits, vegetables, and other manufactures. These and other uses frequently require the addition of coloring matter to the wax suspension. The introduction of this coloring matter into aqueous colloidal wax solutions has presented difficulties. The oil soluble dyes, for instance, are not miscible with the aqueous continuous phase of the suspension; the spirit dyes are not soluble in the water of the wax suspension and their introduction as alcohol solutions removes the water of hydration thereby causing a coagulation and precipitation of the dispersed phase and many of the water soluble dyes disturb the electrical charge on the dispersed particles thereby causing a flocculation of the dispersed phase or the gelation of the entire suspension.

Some water soluble dyes however can be introduced into a wax emulsion without disturbing its stability, but the dye remaining in the film formed by such coating composition, upon coming into contact with water, redissolves and causes spots and streaks to appear in the coated surface. Any object coming into contact with the wetted surface of a wax coating containing this water soluble dye is also discolored thereby.

It is therefore one of the objects of this invention to provide a colloidal wax-in-water suspension in which the foregoing disadvantages are obviated.

Another object of this invention is to provide an aqueous colloidal wax solution containing a water insoluble dye. Another object is to provide a self-lustering wax-in-water suspension which provides a colored glossy wax film containing a water insoluble dye.

A further object of this invention is to provide a colloidal wax-in-water suspension containing a water insoluble dye and an emulsifying agent having a volatile component whereby a colored water resistant coating is produced.

Additional objects and advantages will be apparent from the following detailed description.

The invention broadly stated comprises the manufacture of a colloidal wax-in-water suspension wherein a water insoluble dye is introduced into the oil, fat, or waxy component of the emulsion. It has been found that the oil soluble dyes which are soluble in the fatty constituents of the colloidal solution, such as wax, fatty acids and emulsifying agents, can be dissolved in these ingredients and emulsified therewith so as to become a component part of the particles of the dispersed phase of the suspension. The oil soluble dye is added prior to the emulsification and may be incorporated with any one or all of the ingredients of the suspension in which it is soluble. The introduction of an oil-soluble dye in this manner does not affect the stability of the finished product and provides a homogenous stable wax-in-water suspension containing an oil soluble dye, which, when evenly spread on a smooth surface and exposed to the atmosphere, dries to a lustrous colored wax coating wherein the dye is not removed upon coming into contact with water.

The following procedure is given for the purpose of illustrating the preferred embodiment of this invention. Carnauba wax or any other wax which is commonly employed in manufacturing self-lustering emulsions, is carefully melted with a high molecular weight fatty acid in a hot water or steam bath and maintained at a temperature of about 90° C. This mixture is stirred until well mixed and triethanolamine or other emulsifying agent is then added thereto. An oil soluble dye in a quantity sufficient to give the final product substantial color is added to this molten mixture of wax, fatty acid and emulsifying agent. The heat is discontinued and hot water is then slowly added to this wax mixture in small portions with constant stirring. The mixture becomes increasing viscous until about two-thirds of the water has been added whereupon the mixture inverts from a water-in-oil emulsion to an oil-in-water emulsion and becomes thin. The remaining third of water is then added more rapidly.

The oil soluble dye may be added to any of the oil, fatty or waxy constituents of the colloidal suspension prior to the emulsification, or the dye may be added to a wax, fatty acid, or emulsifying agent and separately emulsified therewith to form a colored emulsion which can then be added to a self-lustering wax-in-water emulsion. In those uses for wax-in-water suspensions which require a water resistant coating, the colloidal wax solution is prepared with an oil soluble dye employing an emulsifying agent having a volatile component. Such emulsifying agents are prepared, in situ, by the reaction of high molecular weight fatty acids with morpholine or other volatile aliphatic or cyclic amines. The composition so formed, when evenly spread upon a smooth surface and exposed to the atmosphere, dries to form a lustrous water-resistant coating by virtue of the evaporation of the morpholine component of the emulsifying agent whereby the coating loses its ability to reemulsify upon coming into contact with water. The introduction of an oil-soluble dye into the morpholine type wax suspension is especially desirable where color is required because these compositions are employed as protective coatings under conditions which require a resistance to water of the dye as well as of the coating itself.

Self-lustering aqueous colloidal wax suspensions containing oil soluble dyes may in some instances possess a surface tension, and an interfacial tension with respect to certain surfaces, which prevents the ready flow of the coating composition. It has been found that the addition of a copal, gum pontianac or other fossil resin or wax soluble phenol formaldehyde resin will enhance the spreading properties of these coating compositions. These resins are melted with the wax or added to the molten wax mixture prior to the addition of the hot water according to the procedure set forth in the above example. Other substances, such as manila gum, shellac, and pontianac gum may be put into an aqueous solution with triethanolamine, morpholine, ammonia, alkalis or alkaline salts and added in this form to the colloidal wax suspension containing the dye, thereby also decreasing the surface tension and increasing the spreading qualities of the wax coating composition.

The aqueous wax emulsions herein described are especially suitable for use as leather dressings, fruit coatings and polishes of various types and provide distinct advantages over prior compositions heretofore employed in these fields. In the fruit industry, for instance, the coloring of fruit is described in the recent patent to Harvey, No. 1,909,860, granted May 16, 1933, and to Smith, No. 2,179,762, granted November 14, 1939. The processes herein described apply the coloring matter to the fruit in a separate step employing solvents or liquid emulsions as means for carrying the dye. In accordance with the present invention, the coloring matter is conveyed with the colloidal wax in the process of wax coating fruit which process is already in extensive use in the industry, thus eliminating the additional expense and injurious handling of the fruit as well as the injurious effects of the higher temperatures required in processes heretofore employed.

It will be apparent that while the invention has been described in its preferred form, changes and modifications may be made in the composition and procedure disclosed without departing from the spirit of the invention defined in the following claims. In this disclosure and in the following claims, the term oil soluble dye is intended to include fat soluble dyes.

We claim:

1. A self-lustering aqueous wax suspension comprising a colloidal suspension of a hard wax in water, as an emulsifying agent the reaction product of a fatty acid of high molecular weight and an alkaline reacting substance selected from the group consisting of monoethanolamine, diethanolamine, triethanolamine, and morpholine, and an oil soluble dye, wherein the said dye is a component part of the solid dispersed phase of the suspension, and wherein said emulsifying agent holds the dispersed phase in such small particle size that the composition will dry with substantial lustre when merely applied to a surface and exposed to the atmosphere.

2. A self-lustering wax suspension comprising a waxy component including carnauba wax, as an emulsifying agent the reaction product of a fatty acid of high molecular weight and an alkaline reacting substance selected from the group consisting of monoethanolamine, diethanolamine, triethanolamine, and morpholine, water, and an oil soluble dye, wherein the said dye is incorporated as a component part of the solid dispersed phase of the suspension, and wherein said emulsifying agent holds the dispersed phase in such small particle size that the composition will dry with substantial lustre when merely applied to a surface and exposed to the atmosphere.

3. An aqueous colloidal wax suspension as defined in claim 1, characterized therein that it contains also a component being a member of the group consisting of fossil resins, and wax soluble phenol formaldehyde resins.

4. An aqueous colloidal wax suspension as defined in claim 2, characterized therein that it contains also a component being a member of the group consisting of fossil resins and wax soluble phenol formaldehyde resins.

5. The process of manufacturing a self-lustering aqueous wax suspension which consists of heating a hard wax to a temperature of about 90° C., adding a fatty acid of high molecular weight and an emulsifying agent selected from the group consisting of monoethanolamine, diethanolamine, triethanolamine, and morpholine, adding an oil soluble dye in an amount sufficient to impart substantial color to the mixture, and then slowly adding hot water with stirring in an amount sufficient to form an emulsion having an aqueous continuous phase and a dispersed phase free from organic solvents.

6. The process of manufacturing a self-lustering aqueous wax suspension which consists of heating a hard wax to a temperature of about 90° C., adding as an emulsifying agent the reaction product of a fatty acid of high molecular weight and morpholine, adding an oil soluble dye in an amount sufficient to impart substantial color to the mixture, and then slowly adding water at or near its boiling point with stirring until the mixture inverts from the water-in-oil to an oil-in-water emulsion having an aqueous continuous phase and a dispersed phase free from organic solvents.

JOHN VERNON STEINLE.
ANTON E. BUDNER.